Patented Jan. 15, 1935

1,988,021

UNITED STATES PATENT OFFICE 1,988,021

PRODUCTION OF UNSATURATED KETONES

Otto Schmidt and Karl Huttner, Ludwigshafen-on-the-Rhine, Germany, assignors to I. G. Farbenindustrie Aktiengesellschaft, Frankfort-on-the-Main, Germany No Drawing. Application July 18, 1932, Serial No. 623,282. In Germany August 8, 1931

23 Claims. (Cl. 260—134)

The present invention relates to the production of unsaturated ketones.

We have now found that aliphatic ketones containing at least on one side of the carbonyl group an unsaturated aliphatic hydrocarbon radicle, especially such with at least 10 carbon atoms preferably such with 17 carbon atoms and on the other side of the carbonyl group a saturated aliphatic hydrocarbon radicle with 1 to 3 carbon atoms, can be readily produced in good yields by passing vapours of one or more volatile aliphatic, that is aliphatic open chain or cycloaliphatic, unsaturated carboxylic acid substances, that is the free acids or their volatile derivatives such as anhydrides, esters, halides or amides, in conjunction with saturated aliphatic, i. e. aliphatic or cycloaliphatic, carboxylic acid substances, that is the free carboxylic acids and volatile derivatives, which contain from 1 to 4 carbon atoms in the acid radicle, over catalysts at elevated temperatures, but below those at which a substantial complete decomposition occurs, i. e. a cleavage within the chain of the initial acids. Suitable unsaturated carboxylic acid substances for the production of these ketones comprise, inter alia, undecylenic acid, oleic, linoleic or linolenic acids, abietic acid, unsaturated naphthenic acids, and the like, and the volatile derivatives of these carboxylic acids such as their esters with aliphatic alcohols of low molecular weight, such as methyl, ethyl, propyl, butyl, glycol or glycerol esters, anhydrides, amides or halides. Particularly valuable are acids, or their derivatives, of oils or fats of vegetal, i. e. vegetable and animal, origin which consist of or mainly comprise unsaturated acids with from 12 to 20 carbon atoms and particularly those with 18 carbon atoms. If desired, the unsaturated carboxylic acid substances may contain an aromatic nucleus connected to a carbon atom, as for example phenyl oleic acid or phenyl-undecyclic acid and their volatile derivatives. If the said acid derivatives are difficultly volatile, as for example glycerides, the reaction takes place apparently simultaneously with or after a conversion of the glycerides into other volatile acid derivatives such as anhydrides or into the free acids, though the nature of these intermediate products has not been ascertained.

The catalysts employed are generally chosen from those which are known to facilitate the splitting off of carbon dioxide from organic substances containing hydroxyl and carboxylic groups and will be therefore defined as decarboxylation catalysts. Such catalysts are for example metal oxides, such as calcium, barium or strontium oxides, manganese oxides, chromium oxides, titanium oxide, zinc oxide, aluminium oxide and thorium oxide or mixtures or compounds thereof, and like compounds which are difficultly reducible by hydrogen, such as phosphates, as well as metals such as iron, copper, cobalt, nickel or their alloys and like base heavy metals. In many cases mixed catalysts may also be employed. It is often advantageous to deposit the catalysts on carriers such as pumice, asbestos and the like, and metals, such as those specifically referred to above and aluminium, may serve as carriers for the said difficultly reducible substances.

The temperatures of working are generally between about 300° and 500° C., a temperature of from about 350° to about 450° C. being usually employed in the production of ketones from acids containing 10 or more, especially 18, carbon atoms. Temperatures above 500° C. are not employed since otherwise the initial materials may be decomposed to hydrocarbons. An advantageous procedure in the production of the ketones is to pass the vapour of the said unsaturated carboxylic acids or of their derivatives continuously if desired together with a volatile, that is gaseous or vaporous inert carrier substance such as methanol, methane, nitrogen, steam or carbon dioxide, or also hydrogen, if high temperatures and or catalysts preventing hydrogenation be employed, over the heated catalyst, and to collect the resulting ketones in cooled receivers. The process can be facilitated especially when working with acids containing 10 or more, especially 18 carbon atoms by carrying it out at a pressure below atmospheric pressure, such as at from 10 to 300 millimetres mercury gauge, whereby the partial pressure of the acid substances within the initial mixtures may be regulated and reduced if the said carrier substances be employed.

For example, a good yield (such as 60 to 70 per cent of the theoretical amount) of heptadecenylmethyl ketone is obtained by passing vapours of oleic acid together with vaporized acetic acid over manganese oxide at from 400° to 425° C. Instead of oleic acid linoleic acid may be used; in this case a higher molecular ketone with a higher iodine number is obtained which contains heptadecendienyl methyl ketone. Mixed unsaturated ketones can also be prepared in the manner described by using as initial material high molecular unsaturated aliphatic carboxylic acids together with propionic acid, butyric acid, and the like. Preferably the lower molecular saturated aliphatic acid may be employed in an excess. It is advantageous to employ it in quantities exceeding equimolecular ratio, for example by from 1 to 2 or 1 to 3 molecular proportions of the component of low molecular weight.

The ketones of the high-molecular unsaturated acids form valuable intermediate products, and most of them constitute, in particular, a suitable initial material for the production of wetting, washing and emulsifying agents as for example according to the British Patent No. 343,098 or they may be employed in the perfume, soap and pharmaceutical industries. If desired, the ketones may be reduced to secondary alcohols by catalytic hydrogenation or with the aid of sodium or active magnesium or aluminium.

The following examples will further illustrate how this invention may be carried out in practice, but the invention is not restricted to these examples.

*Example 1*

1 litre of glass rings of 5 millimetres diameter is intimately mixed with 150 grams of calcium hydroxide and 80 grams of water. This mixture is filled into an upright tubular reaction vessel consisting of copper and heated therein at about 20 millimetres of mercury, and at from 400° to 425° C. From a mixture of 2 molecular proportions of acetic acid and 1 molecular proportion of oleic acid about 100 grams are evaporated per hour and the vapours sucked over 1 litre of the catalyst. The reaction products are partly collected in cooled receivers, whereby a separation of the reaction products can already be obtained by cooling to different temperatures. Thus, an oil is collected in a first non-cooled receiver, mainly water in a second ice-cooled receiver, and substantially acetone, resulting from the acetic acid not consumed for the formation of the mixed ketone, in a third receiver cooled with solid carbon dioxide. The oil, having only a low acid number, is subjected to a fractional distillation in vacuo in which a first running of low boiling portions of aromatic odour is separated, whereafter as the main fraction at 20 millimetres of mercury and at from 180° to 220° C. hepta-decenyl methyl ketone ($C_{17}H_{33}$—CO—$CH_3$) is obtained in a yield of about 60 per cent of the theoretical yield. The residue consists of diheptadecenyl ketone ($C_{17}H_{35}$—CO—$C_{17}H_{35}$).

The reduction of the hepta-decenyl ketone by means of finely divided nickel or copper and hydrogen at elevated pressure and at temperatures of 100° C. and more yields a secondary saturated alcohol, namely heptadecyl methyl carbinol.

If, for example instead of the acetic acid-oleic acid mixture a saturated solution of glacial acetic acid in an oleic acid glyceride, such as olive oil, be employed, about the same yield of hepta-decenyl methyl ketone is obtained. When working in this manner it is preferable to introduce lower quantities of initial material into the reaction chamber than when working with free oleic acid, only about 50 grams of the glyceride mixture per litre of catalyst being brought to reaction.

*Example 2*

Each 80 grams of an equimolecular mixture of oleic acid and acetyl chloride in vapour form are introduced into a tubular reaction vessel and passed at a pressure of from 30 to 50 millimetres of mercury and at 400° C. over each litre of an American, previously thoroughly glowed bauxite. The working up of the reaction product yields hepta-decenyl methyl ketone in an amount of about 30 to 35 per cent by weight of the initial mixture of acetyl chloride and oleic acid.

*Example 3*

If instead of oleic acid according to Example 2 linoleic acid be employed a ketone containing more than one double linkage in the molecule is obtained in about equal yields which is heptadecene-di-enyl methyl ketone ($C_{17}H_{31}$—CO—$CH_3$) in contrast to the said heptadecenyl methyl ketone. Whilst the ketone obtained from oleic acid has an iodine number of about 87 to 90, the ketone obtained from technical linoleic acid has an iodine number of about 150. Instead of the pure linoleic acid, the mixtures of acids of sojabean, train, cotton seed or linseed oils may be employed, or the oils themselves or other volatile derivatives of the said acid mixtures, whereby mixtures of the corresponding unsaturated methyl ketones are obtained.

*Example 4*

50 grams of oleic acid and 10 grams of acetic anhydride in vapour form are sucked per hour over 1 litre of a catalyst of manganese oxide heated to 400° C., the pressure in the reaction vessel being kept at about 30 millimetres of mercury. The said catalyst is prepared in the following manner: 150 grams of manganese carbonate are spread over 1 litre of granulated pumice of about 5 millimetres diameter and the whole is then moistened with 70 cubic centimetres of water and thoroughly mixed. The mixture is then heated in a tubular reaction vessel to from about 400° to 425° C., and vaporous formic acid is led thereover for three hours, whereby the manganese carbonate is converted into manganese oxide. The oily reaction product consists to about 50 to 60 per cent of heptadecenyl methyl ketone, about 30 per cent of oleone and to about 5 to 10 per cent of more volatile constituents boiling at from 100° to 165° C. at 30 millimetres of mercury. The yield of hepta-decenyl methyl ketone amounts to about 40 per cent of the weight of the added oleic acid-acetic anhydride mixture.

*Example 5*

400 parts by weight of manganese nitrate are mixed with 30 parts of water and dissolved therein by warming. The concentrated solution is mixed with 300 parts by weight of porous pumice of about pea-size, the impregnated pumice being then heated in a drum while rotating it until the evolution of nitrous gases has ceased.

A mixture of about 100 litres of carbon dioxide with vapours from 80 grams of the fatty acids of sperm oil and 40 grams of acetic acid are passed at 350° C. and per hour over each litre of the aforesaid catalyst and the reaction products are collected in a series of differently cooled receivers. The oily fraction obtained is subjected to distillation in vacuo whereby, at from 175° to 220° C. at 13 millimetres mercury gauge, a mixture of methyl ketones of the initial fatty acids, having an iodine value of 75, is obtained in a yield of from 60 to 70 per cent of the theoretical yield.

What we claim is:—

1. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle over a decarboxylation catalyst while heating to from about 300° to 500° C.

2. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle at a pressure below atmospheric pressure over a decarboxylation catalyst while heating to from about 300° to 500° C.

3. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle together with a volatile inert carrier substance over a decarboxylation catalyst while heating to from about 300 to 500° C.

4. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle over a metal oxide decarboxylation catalyst while heating to from about 300 to about 500° C.

5. The process for the production of unsaturated ketones which comprises passing vapours of at least one vapourizable aliphatic or cyclo-aliphatic unsaturated carboxylic acid substance containing an acid radicle of at least 10 carbon atoms and of more than equimolecular proportions and of aliphatic saturated carboxylic acid substance containing from 2 to 4 carbon atoms in the acid radicle over a decarboxylation catalyst while heating to from about 300 to 500° C.

6. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle over a decarboxylation catalyst while heating to from about 350° to 450° C.

7. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle at a pressure below atmospheric pressure over a decarboxylation catalyst while heating to from about 350° to 450° C.

8. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle together with a volatile inert carrier substance over a decarboxylation catalyst while heating to from about 350 to 450° C.

9. The process for the production of unsaturated ketones, which comprises passing vapours of at least one vapourizable aliphatic or cyclo-aliphatic unsaturated carboxylic acid substance containing an acid radicle of at least 10 carbon atoms and an aliphatic saturated carboxylic acid substance containing from 2 to 4 carbon atoms in the acid radicle over a metal oxide decarboxylation catalyst while heating to from about 350 to 450° C.

10. The process for the production of unsaturated ketones, which comprises passing vapours of at least one vapourizable aliphatic or cyclo-aliphatic unsaturated carboxylic acid substance containing an acid radicle of at least 10 carbon atoms of vegetal origin and of an aliphatic saturated carboxylic acid substance containing from 2 to 4 carbon atoms in the acid radicle over a decarboxylation catalyst while heating to from about 300 to 500° C.

11. The process for the production of unsaturated ketones, which comprises passing vapours of at least one vapourizable aliphatic or cyclo-aliphatic unsaturated carboxylic acid substance containing an acid radicle of at least 10 carbon atoms of vegetal origin and an aliphatic saturated carboxylic acid substance containing from 2 to 4 carbon atoms in the acid radicle at a pressure below atmospheric pressure over a decarboxylation catalyst while heating to from about 300° to 500° C.

12. The process for the production of unsaturated ketones, which comprises passing vapours of at least one vapourizable aliphatic or cyclo-aliphatic unsaturated carboxylic acid substance containing an acid radicle of at least 10 carbon atoms of vegetal origin and an aliphatic saturated carboxylic acid substance containing from 2 to 4 carbon atoms in the acid radicle together with a volatile inert carrier substance over a decarboxylation catalyst while heating to from about 300 to 500° C.

13. The process for the production of unsaturated ketones, which comprises passing vapours of at least one vapourizable aliphatic or cyclo-aliphatic unsaturated carboxylic acid substance containing an acid radicle of at least 10 carbon atoms of vegetal origin and an aliphatic saturated carboxylic acid substance containing from 2 to 4 carbon atoms in the acid radicle over a metal oxide decarboxylation catalyst while heating to from about 300 to 500° C.

14. The process for the production of unsaturated ketones which comprises passing vapours of at least one vapourizable aliphatic or cyclo-aliphatic unsaturated carboxylic acid substance containing an acid radicle of at least 10 carbon atoms of vegetal origin and of more than equimolecular proportions of an aliphatic saturated carboxylic acid substance containing from 2 to 4 carbon atoms in the acid radicle over a decarboxylation catalyst while heating to from about 300° to 500° C.

15. The process for the production of unsaturated ketones, which comprises passing vapours of at least one volatile, aliphatic unsaturated carboxylic acid substance containing the radicle of an unsaturated fatty acid of at least 10 carbon atoms of vegetal origin and of more than equimolecular proportions of an aliphatic saturated carboxylic acid substance, containing from 2 to 4 carbon atoms in the acid radicle, over a metal oxide decarboxylation catalyst while heating to a temperature between about 350° and about 450° C.

16. The process for the production of unsaturated ketones, which comprises passing vapours of at least one volatile, aliphatic unsaturated carboxylic acid substance containing the radicle of an unsaturated fatty acid with from 12 to 18 carbon atoms, and of more than equimolecular proportions of an aliphatic saturated carboxylic acid substance, containing from 2 to 4 carbon atoms in the acid radicle, over a metal oxide decarboxylation catalyst while heating to a temperature between about 350° and about 450° C.

17. The process for the production of unsaturated ketones, which comprises passing vapours of at least one volatile, aliphatic unsaturated carboxylic acid substance containing the radicle of an unsaturated fatty acid containing 18 carbon atoms, and of more than equimolecular proportions of an aliphatic saturated carboxylic acid substance, containing from 2 to 4 carbon atoms in the acid radicle, over a metal oxide decarboxylation catalyst while heating to a temperature between about 350° and about 450° C.

18. Aliphatic ketones corresponding to the formula $R-CO-R_1$ in which R denotes an unsaturated aliphatic hydrocarbon radicle from 15 to 17 carbon atoms and $R_1$ denotes a saturated aliphatic hydrocarbon radicle with from 1 to 3 carbon atoms.

19. Mixtures of aliphatic ketones corresponding to the formula $R-CO-R_1$ in which $R-CO$ denotes the radicles of unsaturated fatty acids of at least 10 carbon atoms of vegetal origin and R denotes an aliphatic hydrocarbon radicle with from 1 to 3 carbon atoms.

20. Aliphatic ketones corresponding to the formula $R-CO-R_1$ in which R denotes an unsaturated aliphatic hydrocarbon radicle with 17 carbon atoms and $R_1$ denotes a methyl or ethyl group.

21. Mixtures of aliphatic ketones comprising essentially aliphatic ketones corresponding to the formula $R-CO-R_1$ in which R denotes an unsaturated aliphatic hydrocarbon radicle with 17 carbon atoms and $R_1$ denotes a methyl or ethyl group.

22. Heptadecenyl methyl ketone corresponding to the formula $C_{17}H_{33}-CO-CH_3$.

23. Heptadecene-dienyl methyl ketone corresponding to the formula $C_{17}H_{31}-CO-CH_3$.

OTTO SCHMIDT.
KARL HUTTNER.